(12) United States Patent
Lee et al.

(10) Patent No.: US 8,900,457 B2
(45) Date of Patent: Dec. 2, 2014

(54) FERMENTATION AND CHEMICAL TREATMENT OF PULP AND PAPER MILL SLUDGE

(75) Inventors: Yoon Y. Lee, Auburn, AL (US); Wei Wang, Auburn, AL (US); Li Kang, Auburn, AL (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 13/391,549

(22) PCT Filed: Aug. 20, 2010

(86) PCT No.: PCT/US2010/046161
§ 371 (c)(1),
(2), (4) Date: Apr. 5, 2012

(87) PCT Pub. No.: WO2011/022644
PCT Pub. Date: Feb. 24, 2011

(65) Prior Publication Data
US 2012/0273413 A1 Nov. 1, 2012

Related U.S. Application Data

(60) Provisional application No. 61/235,877, filed on Aug. 21, 2009, provisional application No. 61/235,894, filed on Aug. 21, 2009.

(51) Int. Cl.
| | |
|---|---|
| *C12P 7/18* | (2006.01) |
| *D21C 11/00* | (2006.01) |
| *C02F 103/28* | (2006.01) |
| *D21C 3/02* | (2006.01) |

(52) U.S. Cl.
CPC ......... *D21C 11/0007* (2013.01); *C02F 2103/28* (2013.01); *Y02E 50/16* (2013.01); *D21C 3/02* (2013.01)
USPC .......................... 210/606; 435/165; 435/256.7

(58) Field of Classification Search
None
See application file for complete search history.

(56) References Cited

U.S. PATENT DOCUMENTS

| | | | |
|---|---|---|---|
| 4,030,968 A | 6/1977 | Goel et al. | |
| 5,137,599 A * | 8/1992 | Maxham | ........................... 162/5 |
| 2006/0246563 A1 * | 11/2006 | Eroma et al. | .................. 435/158 |
| 2009/0042266 A1 | 2/2009 | Vehmaanpera et al. | |
| 2010/0093060 A1 * | 4/2010 | Jarrell et al. | ............... 435/252.5 |

FOREIGN PATENT DOCUMENTS

WO    WO 2007071818 A1 *   6/2007

OTHER PUBLICATIONS

Dorica et al., Separation of fiber and ash in deinking effluents-a case study, (1995) Tappi J, vol. 78, pp. 109-116.*
PCT Search Report and Written Opinion for PCT/US2010/046161, mailed Feb. 14, 2011.
Szengyel Z et al., "Effect of acetic acid and furfural on cellulase production of Trichoderma reesi RUT C30," *Appl Biochem Biotechnol.*, 2000; 89(1):31-42. (Abstract Only).
Wen et al., "Production of cellulase by Trichoderma reesi from dairy manure," *Bioresour Technol.*, 2005; 95(4):491-499. (Abstract Only).
Romero et al., "Cellulase production by Neurospora crassa on wheat straw," *Enzyme and Microbial Technology*, 1999; 25:244-250. (Abstract Only).

* cited by examiner

*Primary Examiner* — Laura Schuberg
*Assistant Examiner* — Christopher Keller
(74) *Attorney, Agent, or Firm* — Barnes & Thornburg LLP

(57) ABSTRACT

A method of chemically treating partially de-ashed pulp and/or paper mill sludge to obtain products of value comprising taking a sample of primary sludge from a Kraft paper mill process, partially de-ashing the primary sludge by physical means, and further treating the primary sludge to obtain the products of value, including further treating the resulting sludge and using the resulting sludge as a substrate to produce cellulase in an efficient manner using the resulting sludge as the only carbon source and mixtures of inorganic salts as the primary nitrogen source, and including further treating the resulting sludge and using the resulting sludge to produce ethanol.

10 Claims, 8 Drawing Sheets

A

B

FERMENTATION AND CHEMICAL TREATMENT OF PULP AND PAPER MILL SLUDGE

CROSS-REFERENCE TO RELATED APPLICATIONS

This application is a U.S. national counterpart application of PCT International Application Serial No. PCT/US2010/046161, filed Aug. 20, 2010, which claims priority to U.S. Provisional Patent Application No. 61/235,877 having a filing date of 21 Aug. 2009 and U.S. Provisional Patent Application No. 61/235,894 having a filing date of 21 Aug. 2009, all of which are incorporated herein in their entireties by this reference.

STATEMENT OF GOVERNMENT INTEREST

This invention was made with government support under grant number DE-FG36-07G07G01702 awarded by the Department of Energy, and subaward number S-00000307. The Government has certain rights in the invention.

BACKGROUND OF THE INVENTION

1. Technical Field

The present invention generally is in the field of the chemical treatment of pulp and paper mill sludge to recover chemical values. The present invention more specifically is in the field of the bioconversion of pulp and paper mill sludge into value added products. The present invention also more specifically is in the field of the production of cellulase enzymes from delignified lignocellulosic materials found in pulp and paper mill waste streams. The present invention further more specifically is in the field of ethanol production from pulp and paper mill waste streams.

2. Prior Art

Pulp and paper mill sludge is a solid waste material generated from pulping and paper-making operations. Because of high glucan content and its well-dispersed structure, pulp and paper mill sludge is well suited for bioconversion into value-added products. Pulp and paper mill sludge also has high ash content originated from inorganic additives used in pulp and paper making processes, which causes hindrance to bioconversion.

Cellulase enzyme is one of the major cost factors in production of cellulosic ethanol. For this reason, much of the recent research efforts on cellulosic ethanol have been devoted to cellulase enzymes, such as on cellulase producing microorganisms targeting efficient production of cellulase enzymes and improving the characteristics of the enzymes on the molecular level. Also related to cellulase enzyme is pretreatment research, the goal of which is to reduce the enzyme loading. These are important and meaningful tasks in the research of cellulosic ethanol. There is yet another important issue pertaining to cellulase production, namely, the feedstock. From the dearth of currently available literature information, very little attention is being paid to this issue at the moment. Cellulases are currently produced commercially, but in relatively small scale because of its limited market. With the current market value of cellulase, the cost of feedstock is of minor concern. However, this will no longer be the case in the world of cellulosic ethanol, where low cost feedstock is required for production of cellulase. In an economic sense, it is as important as enzyme improvement or devising an efficient pretreatment.

Accordingly, there is a need for improved methods for the chemical treatment of pulp and paper mill sludge to recover chemical values. There also is a need for methods for the bioconversion of pulp and paper mill sludge into value added products. There additionally is a need for methods for the production of cellulose enzymes from delignified lignocellulosic materials found in pulp and paper mill waste streams. There further is a need for methods for ethanol production from pulp and paper mill waste streams. It is to these needs, among others, that this invention is directed.

BRIEF SUMMARY OF THE INVENTION

Briefly, the present invention is a method of treating pulp and/or paper mill sludge to obtain products of value. A first method of the present invention is a method of treating pulp or paper mill sludge, comprising the steps of:
   (a) taking a quantity of sludge from a pulp or paper mill process;
   (b) partially de-ashing the sludge by physical means;
   (c) further treating the sludge with an acid, and then washing off the acid with water;
   (d) further treating the sludge with an alkali; and
   (f) using the resulting sludge as a substrate to produce a cellulase enzyme.

A second method of the present invention is a method of treating pulp and/or paper mill sludge, comprising the steps of:
   (a) taking a quantity of sludge from a pulp or paper mill process;
   (b) treating prehydrolysate obtained from pulp feedstock to a pulp mill with one of an alkali and an activated charcoal;
   (c) mixing the prehydrolysate and sludge from a pulp or paper mill process into a reactor; and
   (d) subjecting the mixed prehydrolysate and sludge to a bioconversion process comprising a hydrolytic enzyme and a microorganism.

A third method of the present invention combines the first and second methods above and is a method of treating pulp and/or paper mill sludge, comprising the steps of:
   (a) taking a quantity of sludge from a pulp or paper mill process;
   (b) treating prehydrolysate obtained from pulp feedstock to a pulp mill with one of an alkali and an activated charcoal;
   (c) mixing the prehydrolysate and sludge from a pulp or paper mill process into a reactor; and
   (d) subjecting the mixed prehydrolysate and sludge to a bioconversion process comprising a hydrolytic enzyme and a microorganism,
wherein the hydrolytic enzyme comprises a cellulase enzyme produced by:
   (i) taking a quantity of the sludge from the pulp or paper mill process;
   (ii) partially de-ashing the sludge by physical means;
   (iii) further treating the sludge with an acid, and then washing off the acid with water;
   (iv) further treating the sludge with an alkali; and
   (v) using the resulting sludge as a substrate to produce the cellulase enzyme.

The present invention uses sludge in the waste stream from pulp and/or paper mills as the initial input for producing products of value, such as to enhance the production of cellulase enzymes and to produce ethanol. An illustrative sludge suitable for use in the present invention is sludge from Kraft paper mills. Sludge from Kraft paper mills has organic contents essentially the same as those of bleached pulp. However, it has a large amount of inorganic components, known as ash, mixed in during the paper making process. The composition of primary sludge from Kraft paper mills is shown in Table 1. The ash is composed of calcium carbonate, the largest component, and other minerals. Sludge from other pulp and paper mills also can be suitable for use in the present invention.

Cellulase enzymes can be produced from delignified lignocellulosic materials such as refined cellulose, pretreated agricultural residues, and waste paper by aerobic fermentation using microorganisms, such as *Trichoderma reesei*. The yield of cellulase enzyme varies widely depending on the composition and other characteristics of the substrate. Pulp and paper mill sludge, when partially de-ashed by physical means, becomes an acceptable substrate for the production of cellulase enzyme. However, the yield of cellulase enzyme from pulp or paper mill sludge is only about one-third of that obtainable from pure cellulose.

One illustrative aspect of the method of the present invention is a method of chemically treating partially de-ashed pulp mill sludge that increases the efficiency of cellulase enzyme production to that of pure cellulose and comprises the following illustrative steps:
a) Partially de-ashing the primary sludge from a Kraft paper mill by physical means to remove about 80% of the total ash (Sludge 2);
b) Sludge 2 is further treated with $H_2SO_4$ until all of the $CaCO_3$ in the ash is converted into $CaSO_4$, which is then washed off with water (Sludge 3); and
c) Sludge 3 is treated with 1 N NaOH to bring the pH of the sludge to a neutral point (Sludge 4); and
d) Using Sludge 4 as a substrate to produce cellulase in an efficient manner using a microorganism, with the resulting sludge as the only carbon source and mixtures of inorganic salts as the primary nitrogen source.

The treated sludge then can be used as a substrate for cellulase enzyme production. *Trichoderma Reesei* Rut C-30 (ATCC 56765) is one microorganism that can be used for producing the cellulase enzymes. The sludge is loaded in the bioreactor at a concentration of about 2.5 g sludge/L. The enzyme production is performed in a 3 L fermenter with a working volume of 2 L. The temperature, pH, agitation, aeration, and dissolved $O_2$ content are controlled at the following fixed levels: 28° C., pH at 3.5 by the addition of $NH_4OH$, and dissolved oxygen at 25% of saturation by aeration and agitation.

The treated sludge is the only carbon source for the cellulase enzyme production, and predominantly inorganic nutrients are used as the nitrogen source for this bioprocess. The cellulase enzyme produced from the de-ashed sludge exhibits cellulase activity of 8 FPU/mL, close to that obtainable from pure cellulosic substrates. The yield of cellulase enzyme is 307 FPU/g-glucan of de-ached sludge and the specific activity is 8.0 FPU/mg protein. In activity tests conducted against the corn stover and a-cellulose, the xylanase activity is higher than that of a commercial cellulase. Relatively high xylan content in the sludge appears to induce high xylanase production. Simultaneous saccharification and fermentation (SSF) is performed using untreated sludge as the feedstock for ethanol production using *Saccharomyces cerevisiae* and the cellulase produced in-house from the sludge. With 6% (w/v) glucan feed, ethanol yield of 72% of theoretical maximum, and 24.4 g/L ethanol concentration is achieved. These results are identical to those of the SSF using commercial cellulases.

A feature of this method is to produce cellulases from pulp and/or paper mill sludge, and to assess the efficiency of enzyme production, determine the properties of the enzyme, and compare them with commercial cellulase where possible. Another feature of this method is to evaluate the cellulase from pulp and/or paper mill sludge by subjecting it to hydrolysis of common feedstocks and saccharification and fermentation (SSF) of the pulp or paper mill sludge. As mentioned above, the cellulase enzyme produced according to the method of the present invention compares favorably with commercial cellulases.

Another illustrative aspect of the method of the present invention is a method for the co-fermentation to ethanol of prehydrolysates and the primary sludge from a Kraft paper mill and comprises the following steps:
a) Treating prehydrolysate obtained from the pulp feedstock with CaO to raise the pH to about 11, adding an aqueous solution of $H_2O_2$ to the prehydrolysate until the total $H_2O_2$ concentration is 1 wt. %, and adjusting the pH to about 4-5;
b) Partially de-ashing the primary sludge from a Kraft paper mill by physical means to remove about 85% or more of the total ash to reduce the ash level to 15 wt. or less and dehydrating the primary sludge to approximately 50% moisture level;
c) Mixing the prehydrolysate and the sludge (feedstock) into a bioreactor such that the solid/liquid ratio in the bioreactor is in the range of 1/8 to 1/6; and
d) Subjecting the mixed feedstock to a bioconversion process comprising hydrolytic enzymes and a microorganism capable of fermenting hexose and/or pentose to ethanol.

In this method, prehydrolysate, in place of water, is added into the bioreactor along with the sludge and there is a net increase of total agar concentration in the bioreactor above that of the base case. Therefore, the product concentration is also increased, reducing the cost of ethanol distillation. The results of the SSF test verifies that this invention increases the concentration of ethanol by as much as 28% over controls.

A feature of this method is to provide for fuel ethanol production as a supplementary unit in pulp and paper mills. This process scheme also can be applied to other fermentation processes where water addition is required to disperse the solid feedstock, such as co-fermentation of sugarcane bagasse and cane sugar, and co-fermentation of corn stover and cheese whey.

Yet another illustrative aspect of the present invention combines the two aspects mentioned above for producing a cellulase for use as the hydrolytic enzyme for further treating paper or pulp mill sludge in a bioconversion process for producing chemical values, such as ethanol.

A representative primary sludge from a Kraft paper mill has the composition of 44.5% glucan, 9.9% xylan, 8.1% lignin, 36.0% ash, and 2.0% unaccounted for (acetyl group and protein), all % by weight. Of the 36% total ash, 26% is acid-soluble ash and the balance (10%) is acid-insoluble ash. The acid-soluble ash is mainly $CaCO_3$, and the acid-insoluble ash is mainly $TiO_2$ and clay;

These methods and features, and other methods, features and advantages of the present invention, will become more apparent to those of ordinary skill in the relevant art when the following detailed description of the preferred embodiments is read in conjunction with the appended figures.

BRIEF DESCRIPTION OF THE TABLES AND FIGURES

Table 1 is a table of the composition of untreated and de-ashed Kraft mill primary sludge.

Table 2 is a table of the composition of primary sludge after centrifugal separation/acid leaching, and alkali leaching.

Table 3 is a table of the specific activities of cellulolytic and hemicellulolytic enzymes in the fermentation broth of Sludge 4.

Table 4 is a table of the cellulase activity and productivity of *T. reesei* Rut C-30 using de-ashed and chemically treated paper mill sludge as substrates.

Figure 8:
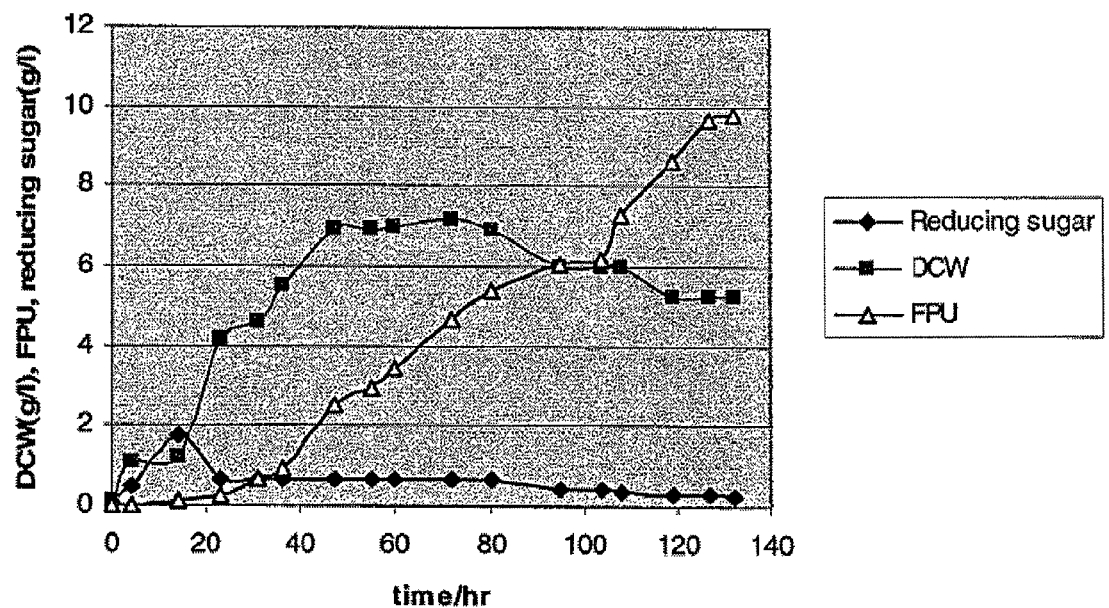

FIG. 8 is a graph of the cellulose production from Solka-Floc (pure cellulose) using 5% loading Solka-Floc, 30° C. for 32 hours then 28° C., *T. reesei* RUT C-30, maximum cellulose activity=9.8 FPU/ml from FPU assay.

DETAILED DESCRIPTION OF PREFERRED EMBODIMENTS

Generally, the present invention is a method of chemically treating partially de-ashed pulp and/or paper mill sludge (also referred to herein as pulp mill sludge, paper mill sludge, and sludge, and with pulp mill and paper mill being used interchangeably) to obtain products of value comprising the steps of taking a sample of primary sludge from a Kraft paper mill process, partially de-ashing the primary sludge by physical means, and further treating the primary sludge to obtain the products of value. Representative products of value include cellulase enzymes and ethanol.

Preferred embodiments of the present invention are, or are based on, the following three illustrative methods:

A method of treating pulp mill sludge, comprising the steps of:
(a) taking a quantity of sludge from a pulp mill process;
(b) partially de-ashing the sludge by physical means;
(c) further treating the sludge with an acid, and then washing off the acid with water;
(d) further treating the sludge with an alkali; and
(f) using the resulting sludge as a substrate to produce a cellulase enzyme.

A method of treating pulp mill sludge, comprising the steps of:
(a) taking a quantity of sludge from a pulp mill process;
(b) treating prehydrolysate obtained from pulp feedstock to the pulp mill with one of an alkali and an activated charcoal;
(c) mixing the prehydrolysate and sludge from a pulp mill process into a reactor; and
(d) subjecting the mixed prehydrolysate and sludge to a bioconversion process comprising a hydrolytic enzyme and a microorganism.

A method of treating pulp mill sludge, comprising the steps of:
(a) taking a quantity of sludge from a pulp mill process;
(b) treating prehydrolysate obtained from pulp feedstock to the pulp mill with one of an alkali and an activated charcoal;
(c) mixing the prehydrolysate and sludge from a pulp mill process into a reactor; and
(d) subjecting the mixed prehydrolysate and sludge to a bioconversion process comprising a hydrolytic enzyme and a microorganism,
wherein the hydrolytic enzyme comprises a cellulase enzyme produced by:
(i) taking a quantity of the sludge from the pulp mill process;
(ii) partially de-ashing the sludge by physical means;
(iii) further treating the sludge with an acid, and then washing off the acid with water;
(iv) further treating the sludge with an alkali; and
(v) using the resulting sludge as a substrate to produce the cellulase enzyme.

1. Cellulase Enzyme Production

Pulp mill sludge is used as the feedstock for cellulase enzymes because of its zero/negative cost. The pulp and paper industry in the US generates 4-5 million tons of sludge per year (Ronneberg, D. and Naik, T. R., www.eere.energy.gov/industry/forest/pdfs/res_solids_2007.pdf, 2007). The quantity of sludge is large enough to meet the total cellulase enzyme need for the entire cellulosic ethanol industry in the US for the foreseeable future. At the present time, most of the sludge is disposed to landfill or incinerated, a significant financial burden to the industry.

Paper mill sludge has characteristics suitable for conversion to value-added products. Kraft paper mill sludge in particular has much higher carbohydrate and lower lignin than natural lignocellulosic substrates (Duff, S. J., et al., Can. J. Chem. Eng. 72, 1013-1020, 1994; Fan, Z. L., et al., Bioprocess Biosyst. Eng. 30, 27-34, 2007; Fan, Z. et al., Bioprocess Biosyst Eng. 30(1), 35-45, 2006). The organic portion of the sludge has a chemical composition very similar to that of commercial grade pulp. It is also important to note that the cost of the carbon source is a major cost item in the production of cellulases (Ruy, D., et al., Enzyme Microb. Technol. 2, 91-102, 1980). Physically, paper mill sludge is much smaller in size than commercial pulp, and has a well dispersed structure and high surface area. It has been proven to be highly efficient for bioconversion to ethanol (Lynd, L. R., Appl. Biochem. Biotechnol. 24/25, 695-7196, 1990). These features make it possible to use it as a bioconversion feedstock without pretreatment, which is a significant economic benefit.

A number of low-cost lignocellulosic substrates have been investigated as a feedstock for cellulase production (Chen, S., et al., Process Biochem. 26, 93-100, 1991; Shin, C. S., et al., Appl. Biochem. Biotechnol. 84/86, 237-245, 2000; Juhasz, T., et al., Process Biochem. 40, 3519-3525, 2005; Lo, C. M., et al., Appl. Biochem. Biotechnol. 121/124, 561-573, 2005; Bigelow, M., et al., Appl. Biochem. Biotechnol. 98/100, 921-934, 2002; Maheshwari, D. K., et al., Carbohydrate Polymers. 23, 161-163, 1994). They include corn stover, wheat straw, bagasse, sawdust, and municipal solid wastes. These studies collectively indicate that these substrates even after substantial pretreatment are inferior to pure cellulosic materials as raw material for cellulase production, generally giving low cellulase titer.

Literature information on using paper mill sludge as a source for cellulase production is scarce. Maheshwari reported on paper mill waste as a substrate for cellulase production using mixed cultures of *Trichoderma Reesei* QM 9123 and *Aspergillus niger* (Maheshwari, D. K., et al., Carbohydrate Polymers. 23, 161-163, 1994). This study, however, did not give enough information to assess the properties of the cellulase produced from the sludge.

Materials and Methods

Substrate Preparation

The paper mill sludge was primary sludge supplied by Boise Paper, Jackson, Ala., US. The sludge was a waste discharged from the paper machine and the Kraft digester. The primary sludge had the composition of: 44.5% glucan, 9.9% xylan, 8.7% lignin, 36.0% ash, 2.0% unaccounted for (acetyl group and protein), all % by weight. The total ash content in the primary sludge was 36%, of which 26% is acid-soluble ash and the balance (10%) is acid-insoluble ash. Based on the Boise Paper making process and the analysis data, acid-soluble ash is mainly $CaCO_3$, and acid-insoluble ash is mainly $TiO_2$ and clay. The collection was made from the wastewater treatment unit. The sludge slurry was separated by a centrifugal cleaner (Laboratory centrifuge LE, CEPA, Germany) into a fiber-rich portion which is carried upward by the current and an ash-rich portion which is carried downward by the current. The upward stream was returned three times to the Centrifugal cleaner to get Sludge 1. Sludge 1 was returned to the air Centrifugal cleaner three times to get Sludge 2 to achieve a high degree of mechanical de-ashing. Sludge 2 was further treated with $H_2SO_4$ until all of the $CaCO_3$ in the ash of the sludge was transformed into $CaSO_4$, which was water washed to get Sludge 3. Sludge 3 was treated with 1 N NaOH to bring the pH of the sludge to neutral to get Sludge 4.

Enzymes

Cellulase enzyme (Spezyme-CP, Lot No. 301-00348-257), was a gift from Genencor/Danisco, Palo Alto, Calif. The activity of Spezyme-CP, as determined by NREL, was 59 FPU/mL. The activity of β-glucosidase (Novozyme-188, Novo Inc., Sigma Cat. No. C-6150) was 750 CBU/mL.

Microorganism

*Trichoderma Reesei* Rut C-30 (ATCC 56765) was used in the cellulase production and *Saccharomyces cerevisiae* ATCC-200062 (NREL-D5A) was used for SSF. *T. reesei* was grown on potato dextrose agar (Difco Lab., Detroit) slants for 5 days at 28° C. The greenish conidia on the agar plate were harvested and suspended in sterile water. The spore suspension was used as inoculum to the media of cellulase production.

A seed culture of *Saccharomyces cerevisiae* D5A for SSF was prepared by inoculating the YPD flask with one loop of *Saccharomyces cerevisiae* D5A on a Petri dish. The yeast was incubated for 12 hours in a rotary incubator shaker at 36° C. and 130 rpm. At the time of transfer to an SSF flask, the optical density (O.D.) of the inoculum was measured to keep a starting O.D. of 0.5.

Culture Media

Pre-cultivation was carried out in a 300 mL Erlenmeyer flask on medium containing: 2 g/L $KH_2PO_4$, 1.4 g/L $(NH_4)_2SO_4$; 0.3 g/L $MgSO_4$; 0.005 g/L $FeSO_4$; 0.075 g/L $MnSO_4$; 0.0015 g/L $ZnSO_4$; 0.002 g/L $CoCL_2$; 0.3 g/L $CaCL_2$; 0.3 g/L urea; 0.015 g/L Tween 80; 0.1 g/L peptone; 5 g/L glucose; 10 g/L Solka-Floc 200 (International Fiber Corporation). The composition of the production medium for cellulase was: 2 g/L $KH_2PO_4$, 1.4 g/L $(NH_4)_2SO_4$; 0.3 g/L $MgSO_4$; 0.005 g/L $FeSO_4$; 0.075 g/L $MnSO_4$; 0.0015 g/L $ZnSO_4$; 0.002 g/L $CoCL_2$; 0.3 g/L $CaCL_2$; 0.3 g/L urea; 0.015 g/L Tween 80; 0.1 g/L peptone; 2.5 g/L solid sludge.

Cellulase Production

A pre-culture containing 100 mL of medium in a 300 mL Erlenmeyer flask was inoculated with 100 μL of spore suspension and incubated at 28° C. on a rotary shaker at 180 rpm. After two days of pre-cultivation, a 10% inoculum from the pre-culture was added to the production medium to initiate the cellulase production. No external inducers were used in pre-culture or cellulase production stage. The enzyme production experiments were performed in a 3 L fermenter (Bioflo III 3000 Fermentor, New Brunswick Scientific, New Jersey, US) with an operating volume of 2 L. Temperature, pH, agitation, aeration, and dissolved $O_2$ were controlled at fixed desired level as follows: 28° C., pH 3.5 by addition of $NH_4OH$, dissolved oxygen at 25% of saturation by aeration and agitation rpm.

Enzyme Analysis

The filter paper activity was determined according to the method of International Union of Pure and Applied Chemistry (IUPAC). 3,5-dinitrosalicylic acid (DNS) method (Miller, G. L., Anal. Chem. 31, 426-428, 1959) was used to estimate the reducing sugar released in 60 min from a mixture of 0.5 mL appropriate diluted enzyme solution, 1 mL 0.1 M acetate buffer (pH 4.8) and 50 mg Whatman No. 1 filter paper, incubated at 50° C. One filter paper unit (FPU) was defined as the amount of enzyme that releases 1 tmol glucose per min based on 2 mg glucose released in 60 min, according to the NREL procedure (NREL Laboratory Analytical Procedure, National Renewable Energy Laboratory, Golden, Colo., available from: www.nrel.govlbiomass/analytical.procedures.html, 2008). Activities were reported as FPU/mL. Carboxymethylcellulase (CMCase; endoglucanase) activity was determined by measuring the release of reducing sugars from 1% carboxymethylcellulose (Sigma) at 50° C. and pH 4.8 (0.1 M acetate buffer) for 10 min (Wood, T. M., et al., Meth. Enzymol. 160, 87-112, 1988). Xylanase activity was determined by the reducing sugar released from a 1% birchwood xylan (Sigma) solution at 50° C. for 5 min (Bailey, M. J., et al., J. Biotechnol. 23, 257-270, 1992). One unit of activity was defined as the amount of enzyme that released either 1 pmol of glucose or xylose as reducing sugar equivalents per min.

β-Glucosidase activity were determined by measuring the release of nitrophenol from 4-nitrophenyl-β-D-glucopyranoside (Sigma) for 15 min at 50° C. and pH 4.8 (0.05 M acetate buffer) (Hagerdal, B., et al., Biotechnol Bioeng. 21(3), 345-55, 1979). The reaction was stopped by the addition of 1 M $Na_2CO_3$, and the absorbance was read at 410 nm from a nitrophenol standard curve. One unit of activity was defined as the amount of enzyme that released 1 pmol of 4-nitrophenol per min.

Extracellular protein was assayed according to Bradford's method (Bradford, M. M., Anal. Biochem. 72, 248-254, 1976), using bovine serum albumin as the standard. The compositional analysis of sludge samples were conducted according to the NREL analytical procedure. The sugar contents in the hydrolysates were analyzed by HPLC equipped with RI detector using BioRad Aminex HPX-87P column at 85° C. The mobile phase was HPLC grade water, the flow rate was 0.55 mL/min. Acid soluble lignin (wt. %) and ash content were determined by the NREL analytical procedure.

Enzymatic Hydrolysis

The enzymatic digestibility tests were carried out in 250 ml Erlenmeyer flasks with total liquid volumes of 100 ml according to the NREL analytical procedure. The conditions of enzymatic digestibility tests were 50° C. and pH 4.8 (0.05 M sodium citrate buffer). Two different substrates, α-cellulose (Sigma C-8002, Lot 114K0244) and pretreated corn stover (from NREL, treated with 1.4% $H_2SO_4$ and heated to 190° C. by direct steam injection for 10 min followed by explosive decompression at the NREL PDU) were tested for enzymatic hydrolysis respectively. The dilute-acid treated corn stover had the composition of: 59.7% glucan, 2.8% xylan, 1.2% other sugars, 26.9% Mason lignin, 1.9% acid soluble lignin, 4.6% ash, 2.3 wt % acetyl. Sigma α-cellulose had a composition of 76% glucan, 20% xylan, 4 wt. % unaccounted for (lignin, acetyl group, ash, and protein). The initial glucan concentration was 3% or 6% (w/v). Enzyme loadings were: 5 and 15 FPU/g glucan. Spezyme CP (Genencor/Danisco) or the cellulase produced herein from sludge were used with supplementation of 10 and 30 CBU/g glucan of β-glucosidase (Novozyme 188) for the respective cellulase loadings. Samples were taken periodically and analyzed for glucose, xylose and cellobiose using HPLC. The glucan digestibility was defined as the percentage of actual glucose and cellobiose released over theoretical maximum.

Simultaneous Saccharification and Fermentation (SSF)

SSF experiments were carried out at 36° C. in 250 mL Erlenmeyer flasks according to the NREL analytical procedure. Each SSF flask, with working volume of 100 mL, was loaded with 6% w/v glucan of untreated primary sludge, 1% yeast extract and 2% peptone. The flasks were autoclaved and cooled. The flasks were then aseptically inoculated with 10 mL of yeast suspension which was grown for 12 hours at 36° C. and 130 rpm in the Yeast extract Peptone Dextrose (YPD) medium. The reaction was then initiated by addition of enzyme; Spezyme CP (Genencor, Lot No. 301-00348-257) or the cellulase produced herein from sludge. The enzyme loading was 15 FPU of cellulase supplemented with 30 CBU of (β-glucosidase/g-glucan. Samples were taken aseptically over the course of 5 days and analyzed for ethanol by HPLC using a BioRad Aminex HPX-87H.

Results and Discussion

Composition of Paper Mill Sludge

Pulp and paper mills produce various types and amount of sludge depending on their raw material, process, and final product. The composition of sludge varies widely depending on the sources. The sludge used herein was the primary sludge generated from a Kraft paper mill. Table 1 presents the composition of the sludge. After two-stages of mechanical de-ashing, the ash content was reduced to 11.4%.

Production of Cellulase Enzyme from De-Ashed Primary Sludge

The composition analysis of the primary sludge indicates that the lignin content is much lower than pretreated lignocellulosic feedstocks. On the one hand, the low lignin content of the sludge is a highly desirable feature as a substrate for $T.$ $reesei$ that is known to show low viability when it is grown with a substrate containing high non-glucan impurities. On the other hand, high ash content in the sludge is a deterrent to the growth of this microorganism and a strong inhibitor to cellulase enzyme production. Inorganic residues accumulated from various stages of the paper making process can give negative effects on the cellulase production. High ash content also causes additional problems in the bioconversion process in general even if it is to be used as a feedstock for other value-added products such as ethanol. It can reduce the enzyme efficiency and limit the solid loading which will lower the product concentration. In initial testing, use of untreated sludge as the carbon substrate, $T.$ $reesei$ did not show any growth in the fermentation medium described earlier. Ash and other components in the sludge greatly inhibit the cell growth, and most likely the cellulase production as well. In order to utilize it effectively, it was necessary to remove ash from the carbohydrates. To achieve this, primary paper sludge slurry was de-ashed in two stages as described previously (Sludge 1, Sludge 2). The composition of Sludge 1 is shown as in Table 1. The ash content of Sludge 1 was decreased to 21.8%, but cellulase activity measured for the culture broth in 3-L fermenter was still poor (data not shown). The mycelium grew poorly in the sludge medium even after proper adjustment of the initial pH.

Figure 1:
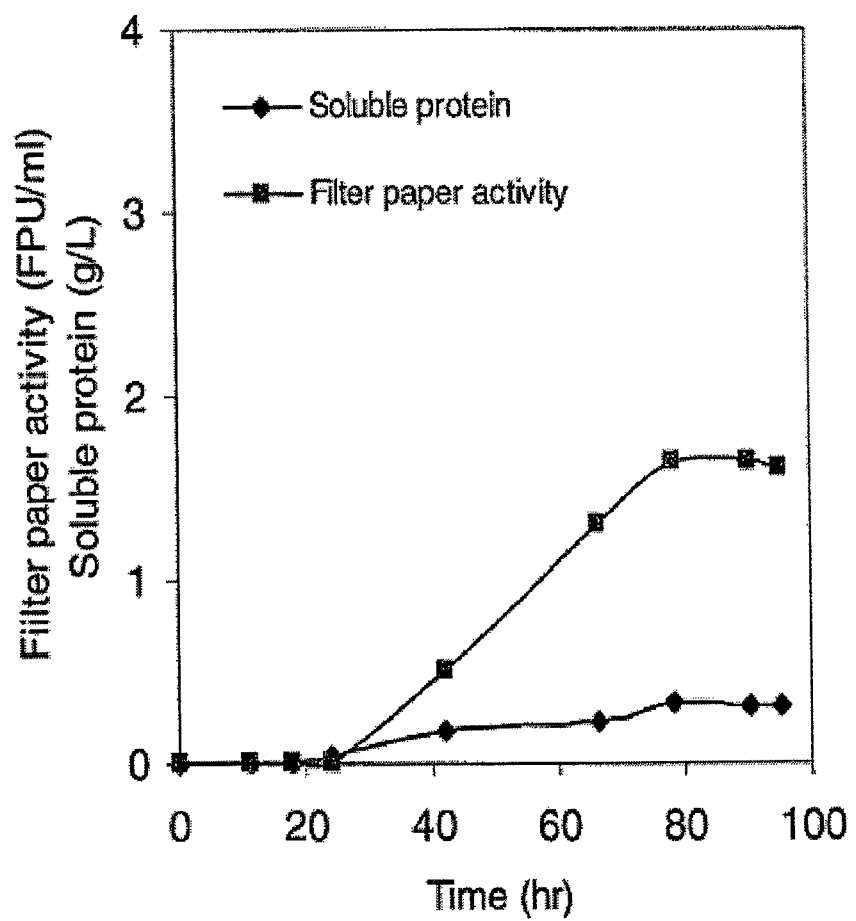
FIG. 1 is a graph of cellulase production by *T. reesei* using 2.5% glucan (w/v) water-washed Sludge 2.

Sludge 1 was then further de-ashed by putting it to the Centrifugal cleaner three times to get Sludge 2, in which the ash content was reduced to 11.4% (Table 1). In the ensuing cellulase production experiment using Sludge 2, a 25-hr lag phase was observed before cellulase activity was detected. With an initial substrate concentration of 2.5% (w/v) glucan of Sludge 2, the maximum cellulase titer of 1.7 FPU/mL was achieved after 3 days (FIG. 1). Increase of the substrate concentration (Sludge 2) from 2.5% to 3.5% glucan did not show any improvement of cellulase titer. Although Sludge 2 had high glucan content and relatively low ash and lignin, it was not effective in cellulase production. The ash content in Sludge 2 somehow inhibited cellulase production. The ash contains mostly inorganic substances including $CaCO_3$, $TiO_2$, and clay, which are water-insoluble and presumably inert. How these inorganic substances interfere with the microbial reaction is unclear. Interference with oxygen transfer into the microorganism may be one of the factors hampering cellulase production in $T.$ $reesei$, which is a highly aerobic process.

Cellulase Production from De-Ashed, Chemically Treated Primary Sludge

Figure 2:
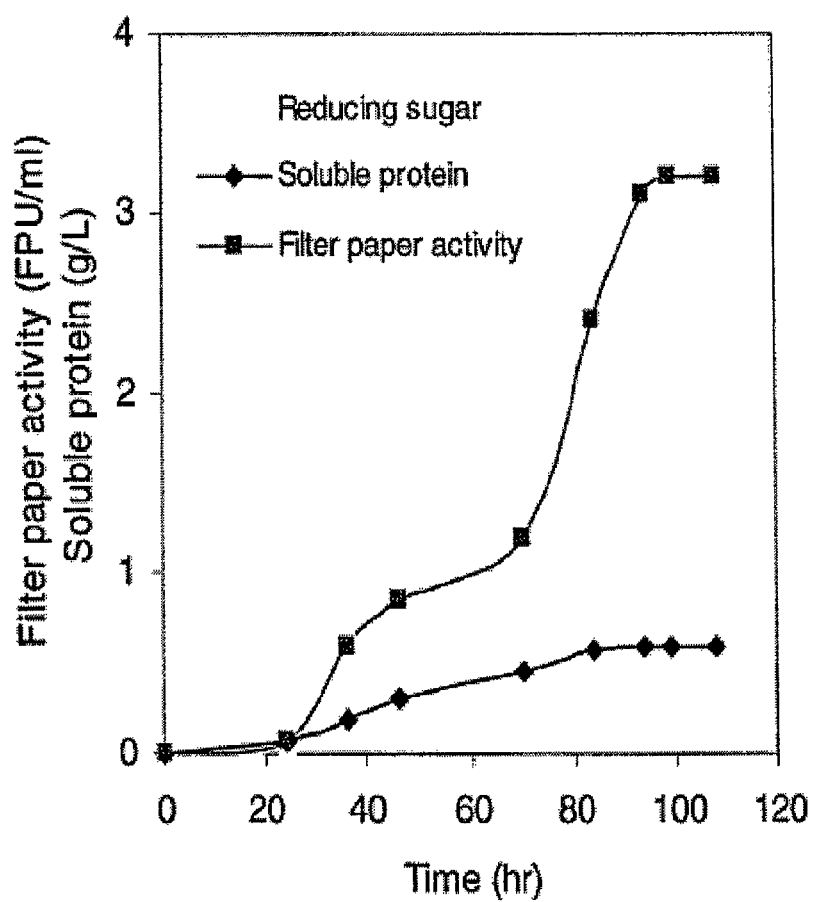
FIG. 2 is a graph of cellulase production by *T. reesei* using 2.5% (w/v) acid leached sludge.

In an effort to enhance the cellulase production, further treatment of Sludge 2 was attempted. Sludge 2 was leached with 1 N sulfuric acid until most of $CaCO_3$ in the ash was converted to $CaSO_4$ by the reaction of: $H_2SO_4$+ $CaCO_3 \rightarrow CaSO_4+H_2O+CO_2$. $CaSO_4$ has higher solubility in water than $CaCO_3$. The sludge was water-washed to remove $CaSO_4$ creating Sludge 3. As shown in Table 2, the ash content in Sludge 3 was reduced to 4.7%. Cellulase production from Sludge 3 was substantially better than the previous runs (FIG. 2). The cellulase production commenced within 24 hr, indicating that the lag phase was shortened. Better substrate uptake and cell growth were also noticeable. The cellulase production was improved to attain the filter paper activity of 3.2 FPU/mL and volumetric productivity of 37.5 FPU/L·h (over a 96 hr period).

Seeking further improvement of cellulase production, Sludge 3 was treated with 1% (w/v) NaOH resulting Sludge 4. By this treatment, the ash decreased to 3.8% and glucan and total carbohydrate was increased to 74.5% and 89.5%, resembling the composition of bleached Kraft pulp. These successive treatments presumably have removed most of the inhibitory chemicals that are harmful to the cellulase production. In the ensuing experiment, Sludge 4 was used at the level of 3.5% glucan (w/v). The strain grew well and produced cellulase titer much higher than the previous runs. The yield of cellulase enzyme and volumetric productivity reached 307 FPU/g of cellulose and 60.6 FPU/L·h, respectively. The specific filter paper activity was 8 FPU/mg-protein in broth. The protein based specific activity is much higher than those observed with commercial cellulases. It is probably because inorganic salts were used herein as the primary nitrogen source, therefore, background protein was very low in the broth. Table 3 shows the activities of cellulolytic and hemicellulolytic enzymes in the fermentation broth. The cellulase titers, volumetric productivities of the Sludge 4 run are summarized in Table 4.

As shown in Table 4, all aspects of cellulase enzyme production were far superior for Sludge 4 to other sludges. The drastic difference between Sludge 3 and Sludge 4 was surprising because composition-wise, there is little difference between them (Table 2). There is no clear explanation for this at this time. Sludge 3 may contain a small amount of NaOH washable impurities that somehow strongly interfere with cellulase production. The titer of the cellulase produced from Sludge 4 (named as AU-S4 enzyme, hereafter) was 8.0 FPU/ mL, which is comparable to those reported for cellulases produced from high grade commercial cellulose including Solka-Floc (Velkovska, S., et al., J. Biotechnol. 54, 83-94, 1997; Domingues, F. C., et al., Enzyme Microb. Technol. 26, 394-401, 2000).

The specific activity of AU-S4 was 8.0 FPU/mg-protein. This value was 5-10 times higher than reported specific activity of commercial cellulases. These numbers, however, do not necessarily reflect the molecular activities of the respective enzymes. It may have more to do with the fact that some of the commercial enzymes contain non-enzyme proteins mixed in as a nutrient during fermentation. In production of AU-S4, nitrogen sources were mostly inorganic salts; therefore, only the enzymes are counted as protein. The titer and the specific activity of AU-S4 are high enough to be used without further concentration of the broth, if it is to be used on-site.

Yield is also a very important cost factor in cellulase production. In production of AU-S4, the yield in terms of activity was 307 FPU/g-cellulose in Sludge 4. Translating it into practical terms, one ton of glucan in the sludge can produce cellulase enzyme that can hydrolyze 20 tons of cellulose in lignocellulosic feedstock (calculation basis: 15 FPU/g-glucan). A typical pulp mill produces 100 dry MT of sludges/day, which is sufficient to support several commercial scale cellulosic ethanol plants.

Enzymatic Hydrolysis Test

Figure 4:
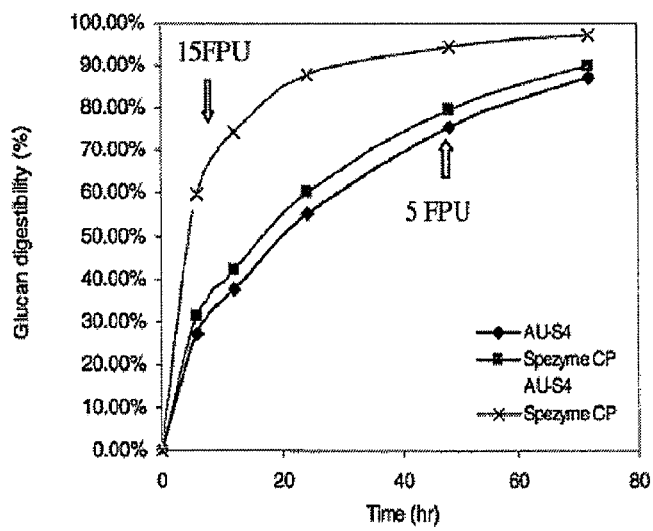
FIG. 4 is a graph of enzymatic hydrolysis of pretreated corn stover by AU-S4 and Spezyme CP.
Figure 4:
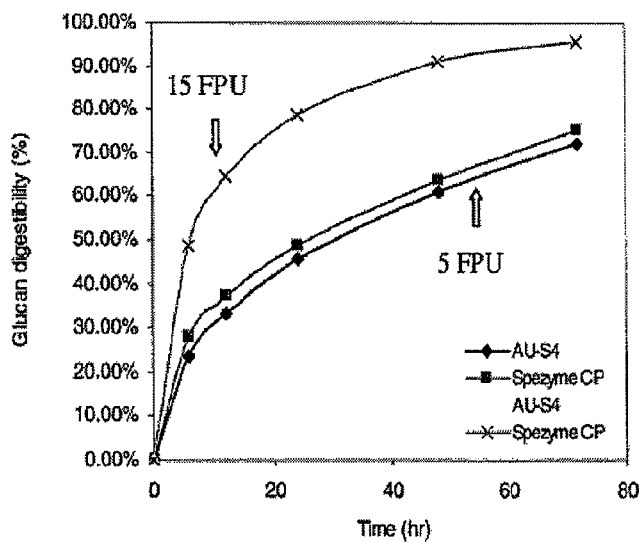

Performance test was conducted for the AU-S4 enzyme using two different substrates: corn stover pretreated by dilute-acid and Sigma α-cellulose. The same hydrolysis test was also done for Spezyme CP (Genencor, Lot No. 301-00348-257) for comparison purposes. Two different levels of glucan loadings (3% and 6% glucan, w/v) and two levels of enzyme loadings (5 FPU and 15 FPU/g-glucan) were applied. The enzymes were supplemented with β-glucosidase (Novozyme-188) at the ratio of 2 CBU per FPU. The hydrolysis profiles for pretreated corn stover are shown in FIG. 4.

In side by side comparison of AU-S4 and Spezyme CP, the yield and the glucose profile were found to be almost identical at high enzyme loading of 15 FPU/g-glucan. The yield with high glucan loading was lower than with low glucan loading, a phenomenon commonly observed in enzymatic hydrolysis of cellulose. With low enzyme loading of 5 FPU/g-glucan, Spezyme CP has shown slightly higher yield than AU-S4 (FIG. 4). The difference was more discernible (−3%) with 3% glucan loading (FIG. 4A) than high 6% glucan loading (FIG. 4B). As the enzymes were supplemented with (β-glucosidase, the difference in gross activity indicates that there is a difference in endo- and exo-glucanase activities between the two enzymes.

Figure 5:
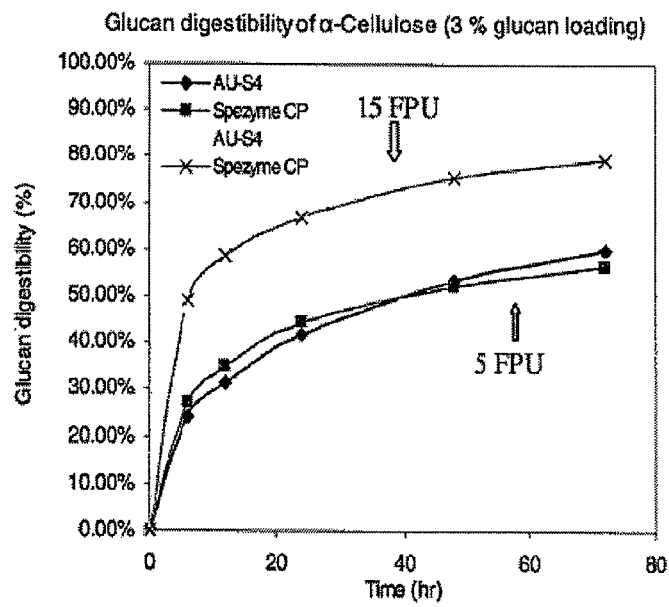
FIG. 5 is a graph of enzymatic hydrolysis of α-cellulose by AU enzyme and Spezyme CP.
Figure 5:
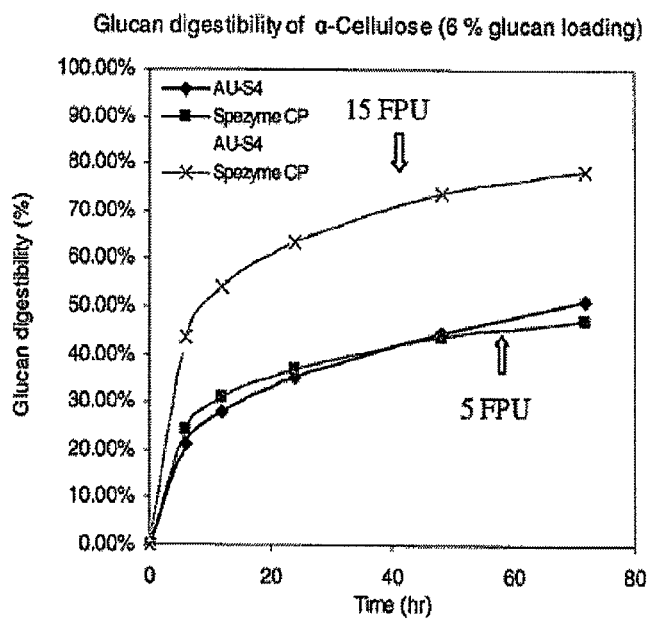

The same comparison tests were repeated using α-cellulose as the substrate. The results were significantly different from the previous test as indicated in FIG. 5. In all four cases, high and low enzyme loading and glucan loading, AU-S4 has shown higher overall glucose yield than Spezyme CP. The difference is more discernible with high enzyme loading (15 FPU/g-glucan). The 72 hr yields were as follows: 85.82% (3% glucan loading) and 86.81% (6% glucan loading) for AU-S4, and 79.11% (3% glucan loading), 78.53% (6% glucan loading) for Spezyme CP. Spezyme CP, however, has shown higher initial activity, especially with low enzyme loading (5 FPU/g-glucan).

Figure 6:
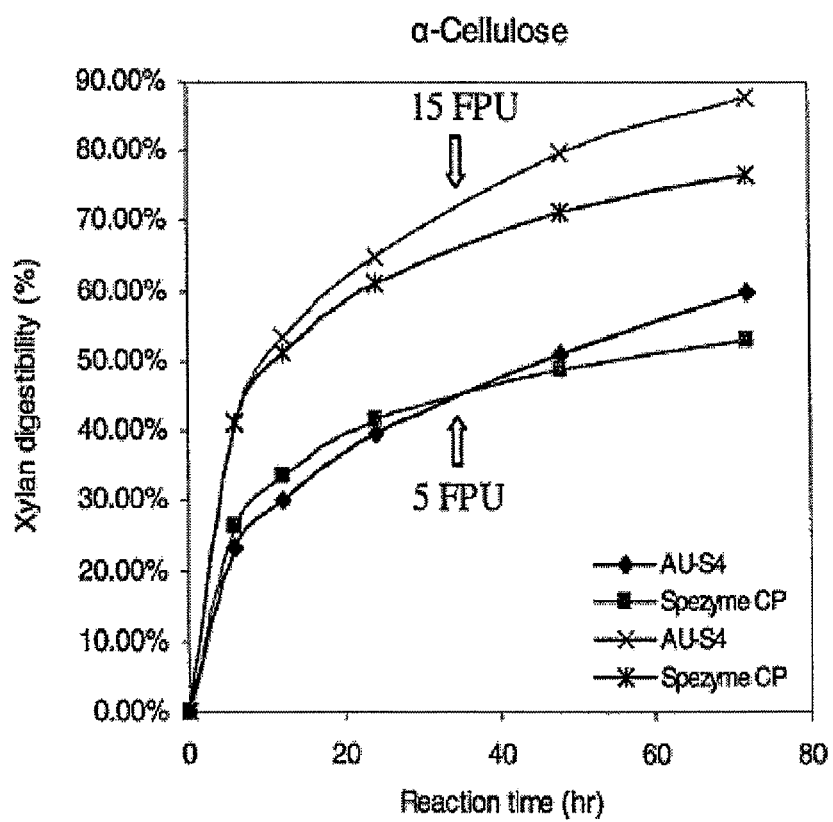
FIG. 6 is a graph of xylan digestibility of α-cellulose by AU enzyme and Spezyme CP.

The major difference between the two substrates is in the xylan content; 2.8% in acid-treated corn stover vs. 20% xylan in a-cellulose. It is speculated that the difference in yield has to do with the xylanase activity. The xylan data therefore was extracted from the same experiments to compare the xylanase activity of the two enzymes. Xylan digestibility profiles for the two enzymes are shown in FIG. 6. The results confirm that AU-S4 has significantly higher xylanase activity than Spezyme CP. High xylanase activity of AU-S4 appears to be related with the fact that Sludge 4 has relatively high xylan (15%) that may have acted as an effective inducer for xylanase production by *T. reesei*. It is well-known that removal of hemicellulose increases the enzyme accessibility to cellulose, consequently, increases the glucan digestibility (Gupta, R., et al., Appl. Biochem. Biotechnol. 148(1-3), 59-70, 2008). These findings reaffirm hat the high overall glucan yield observed with AU-S4 in hydrolysis of a-cellulose was due to its high xylanase activity.

SSF Test

Figure 7:
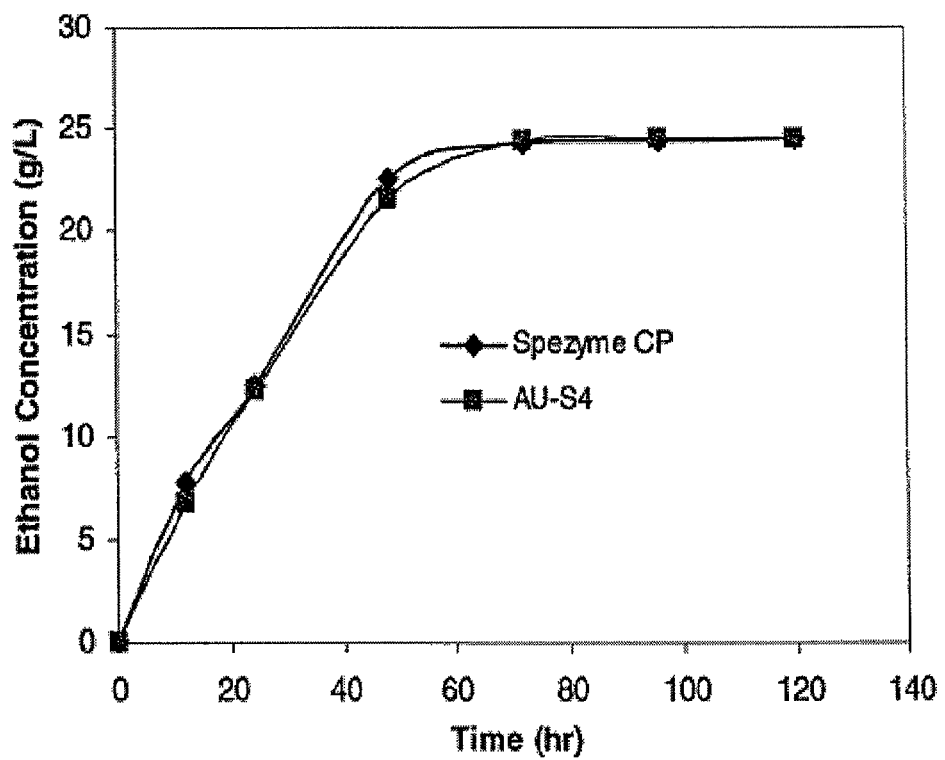
FIG. 7 is a graph of ethanol production from untreated primary sludge in SSF (*Saccharomyces cerevisiae*, ATCC-200062, 6% glucan loading).

The AU-S4 was further tested for its performance putting it through an SSF test using the enzyme and yeast (*S. cerevisiae*) simultaneously as described previously. In this test, untreated paper sludge was used. A comparison test was also made with Spezyme CP. The results of FIG. 7 indicate that the there is no significant difference between the two enzymes in their performance. For both enzymes, the 72 hr ethanol yield based on glucan was 72% and the ethanol concentration was 24.4 g/L. These are acceptable performance indexes in ethanol production by SSF. Unlike cellulase production by *T. reesei*, ash in the sludge was not inhibitory to ethanol production by *S. cerevisiae*.

Illustrative Method

Using the present invention, Kraft paper mill sludge is a feedstock amenable for bioconversion to cellulase enzymes by *T. reesei* Rut C-30. For efficient production of cellulase, the ash content of the sludge should to be reduced to less than 4%. One method to achieve this is centrifugal separation followed by successive chemical treatments by sulfuric acid and NaOH by:

a) Using a sample of primary sludge from a Kraft paper mill having the composition of 44.5% glucan, 9.9% xylan, 8.1% lignin, 36.0% ash, and 2.0% unaccounted for (acetyl group and protein), all % by weight. Of the 36% total ash, 26% is acid-soluble ash and the balance (10%) is acid-insoluble ash. The acid-soluble ash is mainly $CaCO_3$, and the acid-insoluble ash is mainly $TiO_2$ and clay;

b) The primary sludge is partially de-ashed by physical means, such as for example water-washing on a screen or continuous centrifugation, to remove about 80% of the total ash (Sludge 2);

c) Sludge 2 is further treated with $H_2SO_4$ until all off the $CaCO_3$ in the ash is converted into $CaSO_4$, which is then washed off with water (Sludge 3); and d) Sludge 3 is treated with 1 N NaOH to bring the pH of the sludge to a neutral point (Sludge 4).

The sludge thus treated and the enzyme produced from it are referred to as Sludge 4 and AU-S4, respectively. *T. reesei* can produce cellulase in an efficient manner using Sludge 4 as the only carbon source and mixtures of inorganic salts as the primary nitrogen source. The cellulase production yield of 307 FPU/g-glucan of sludge, and productivity of 60.6 FPU/ L·hr are achievable from Sludge 4. The titer of enzyme is 8.0 FPU/mL, which is comparable to those reported in the literature for cellulases produced from pure cellulosic substrates. The protein based specific activity of AU-S4 is much higher than that of commercial cellulases. The main reason is that AU-S4 is produced using inorganic salts as the main nitrogen source; therefore, the amount of background protein was very low in the broth. On the basis of same FPU, AU-S4 has slightly lower glucanase activity, but higher xylanase activity than Spezyme CP. In the SSF test using partially de-ashed Kraft sludge as the substrate, no difference was found between AU-S4 and Spezyme CP in their performance, attaining identical ethanol profiles.

Figure 3:
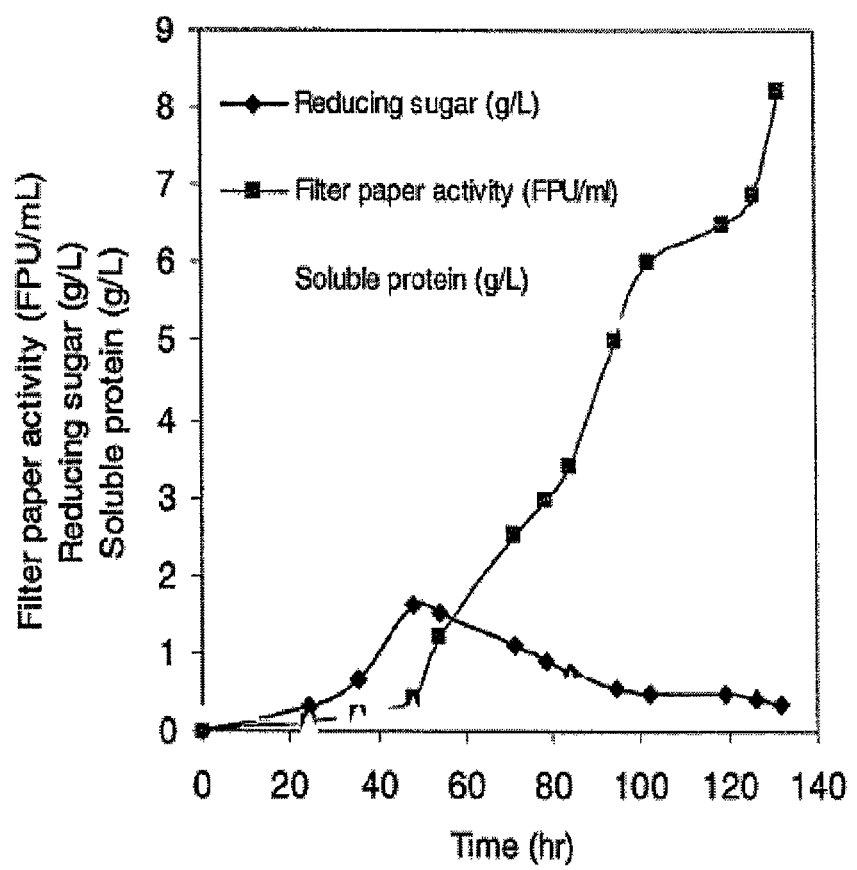
FIG. 3 is a graph of cellulase production by *T. reesei* using 3.5% (w/v) acid and alkali leached sludge.

Illustrative results of the present invention using *T. reesei* are shown in the Tables and Figures. The cellulase enzyme production profiles for Sludge 2, Sludge 3, and Sludge 4 are shown in FIGS. 1-3. The cellulase enzyme yield, productivity, and titer are shown in Table 4 for these three runs. The level of cellulase enzyme titer obtained from Sludge 4 is similar to that of pure cellulose (see FIG. 4). It is important to note that there is a vast difference in the enzyme production between Sludge 3 and Sludge 4 (see FIGS. 2 and 3), although little difference is seen in the composition of these two sludges (see Table 2). The elemental analysis data of the sludges indicate that most of the aluminum in Sludge 3 is removed by NaOH treatment. It is speculated that aluminum ion ($Al^{+3}$) is inhibiting cellulase production by *T. reesei*. The method of the present invention effectively removes aluminum ion from the sludge. Activities of cellulase enzyme produced from Sludge 4 are shown in Table 3. The specific additives are comparable to those of commercial cellulases (Spezyme CP of Genencor/Danisco, Cellulast of Novozyme).

2. Ethanol Production

Most of the hemicellulose fraction of pulp mill feedstock (pine or hardwood) is released into black liquor during pulping process and is used as a fuel for generation of steam and electricity. It is technically feasible to recover this fraction of carbohydrate and enhance its value by converting it into value-added products. In the scheme of this invention, hemicellulose is selectively converted to soluble sugars (termed as prehydrolysate) treating it by acid catalyst. It is done in a way that the cellulosic faction of the feed is not altered, therefore, the quality of the pulp produced from it is unaffected by prehydrolysis.

The sugars produced from prehydrolysis are mixtures of pentose, hexose, and their oligomers. The present invention allows for the recovery of the sugars in the range of 12-15% of the initial pulp feedstock in weight. Bioconversion of these sugars can produce 18-22 gallons of ethanol per dry metric ton (MT) of pulp feedstock. For example, for a pulp mill with feed capacity of 1000 dry MT/day, 18,000-22,000 gallons of ethanol can be produced as a byproduct. This is in addition to 7,000 gallons of ethanol/day that can be produced from pulp mill sludge.

The hydrolysate obtained by acid treatment of wood has a total sugar concentration below 5 wt. %. If it is used as a fermentation substrate, the ethanol concentration is less than 2.5%, which is far below the level acceptable as distillation feed. A main feature of this invention is to use a mixture of prehydrolysate and pulp mill sludge as the fermentation feed as a means to increase the product concentration. Paper mill sludge is one of the most attractive feedstocks for production of cellulosic ethanol. In conversion of paper mill sludge by simultaneous saccharification and fermentation (SSF) with fed-batch operation, ethanol with 5-6% concentration can be obtained. In bioconversion of the sludge, a certain amount of water is added to attain fluidity required for SSF operation. In this invention, prehydrolysate, in place of water, is added into the bioreactor along with the sludge, resulting in a net increase of total agar concentration in the bioreactor above that of the base case. Therefore, the product concentration is also increased, reducing the cost of ethanol distillation.

The prehydrolysates produced from acid-treatment of wood also contain toxins, primarily lignin and sugar degradation products, that strongly inhibit microbial action. The prehydrolysate, therefore, has to be detoxified for efficient conversion to ethanol.

Procedure

Method to Detoxify the Prehydrolysates

Prehydrolysate obtained from pulp feedstock is treated with calcium oxide (CaO) to raise the pH toll. An aqueous solution of hydrogen peroxide ($H_2O_2$) is added to the hydrolysate until the total $H_2O_2$ concentration in the hydrolysate becomes 1 wt. %). The pH is adjusted to 4-5, which is the optimum level for the subsequent bioconversion process. These procedures can be done at temperatures ranging from room temperature to 100° C. The treatment times are adjusted according to the temperature.

Co-Fermentation of Prehydrolysates and Pulp Mill Sludge

Paper mill sludge is partially de-ashed by physical method to reduce the ash level to 15 wt. % or less. Suitable de-ashing processes include continuous centrifugation, air floatation, or other solid/liquid separation methods. The sludge then is dehydrated by filter-press (or equivalent method) to approximately 50% moisture level. The sludge and the detoxified prehydrolysate are mixed into a bioreactor. The amount of each is adjusted such that the solid/liquid ratio in the reactor falls in the range of 1/8-1/6 to attain fluidity required for efficient bioconversion.

The mixed feedstock then is subjected to a bioconversion process where hydrolytic enzymes and a microorganism capable of fermenting hexose and/or pentose to ethanol are applied simultaneously.

Example Process

Hydrolysate is produced from pine and is composed of sugars released from hemicelluloses. The largest sugar component in the example prehydrolysate is mannose. The fact that the sugar concentration rises after secondary hydrolysis indicates that most of the sugars in the hydrolysate exist in oligomer form, which are not fermented by yeast.

Bioconversion to Ethanol

Simultaneous Saccharification and Fermentation is applied to the mixture of the pulp mill sludge and the prehydrolysate. The details of the SSF are as follows:

Enzyme Loading: Cellulase (Spezyme CP, 15 FPU/g glucan)+Cellobiase (Novozyme-188, 30 CBU/g-glucan)+0.1 ml Pectinase (Danisco-Genencor)/100 ml of working volume Microorganism: *Saccharomyces cerevisiae* (ATCC-00062). *Saccharomyces cerevisiae* is used in this example because the example hydrolysate contains mostly hexoses (mannose, glactose, and glucose)

Operating conditions: 37° C., 200 RPM in shake flask

Pectinase enzyme was added to hydrolyze oligomers of mannose and galactose.

The results of the SSF test verifies that this invention increases the concentration of ethanol by 28% from 27.6 g/L to 35.1 g/L in direct comparison with a control run. This result is based on single feeding. Fed-batch operation (successive feeding of dewatered sludge) can improve the ethanol concentration above the level obtained from Ingle feeding run.

This process has many potential applications. An illustrative application is for fuel ethanol production as a supplementary unit in pulp mills. This process scheme also can be applied to other fermentation processes where water addition is required to disperse the solid feedstock, such as the co-fermentation of sugarcane bagasse and cane sugar, and the co-fermentation of corn stover and cheese whey.

Illustrative Method

Using the present invention, Kraft paper mill sludge is a feedstock amenable for bioconversion to ethanol by a microorganism, such as *Saccharomyces cerevisiae*. One method to achieve this is the co-fermentation to ethanol of prehydrolysates and the primary sludge from a Kraft paper mill and comprises the following steps:

a) Treating prehydrolysate obtained from the pulp feedstock with CaO to raise the pH to about 11, adding an aqueous solution of $H_2O_2$ to the hydrolysate until the total $H_2O_2$ concentration is 1 wt. %, and adjusting the pH to about 4-5;
b) Partially de-ashing the primary sludge from a Kraft paper mill by physical means to remove about 85% or more of the total ash to reduce the ash level to 15 wt. or less and dehydrating the primary sludge to approximately 50% moisture level;
c) Mixing the prehydrolysate and the sludge (feedstock) into a bioreactor such that the solid/liquid ratio in the bioreactor is in the range of 1/8 to 1/6; and
d) Subjecting the mixed feedstock to a bioconversion process comprising hydrolytic enzymes and a microorganism capable of fermenting hexose and/or pentose to ethanol.

3. Ethanol Production Using Cellulase Enzyme

The methods disclosed above can be combined to result in an overall method to produce chemical values, such as ethanol, using cellulase enzymes, all produced using paper or pulp mill sludge. This combined method is a method of chemically treating pulp mill sludge, comprising:

(a) taking a quantity of sludge from a pulp mill process;
(b) treating prehydrolysate obtained from pulp feedstock with one of an alkali and an activated charcoal;
(c) mixing the prehydrolysate and sludge from a pulp mill process into a reactor; and
(d) subjecting the mixed prehydrolysate and sludge to a bioconversion process comprising a hydrolytic enzyme and a microorganism, wherein the hydrolytic enzyme comprises a cellulase enzyme produced by:

(i) taking a quantity of the sludge from the pulp mill process;
(ii) partially de-ashing the sludge by physical means;
(iii) further treating the sludge with an acid, and then washing off the acid with water;
(iv) further treating the sludge with an alkali; and
(v) using the resulting sludge as a substrate to produce the cellulase enzyme.

In an illustrative embodiment, the hydrolytic enzyme comprises an enzyme selected from the group consisting of cellobiase, pectinase, xylanase, mannose, and combinations thereof. In another illustrative embodiment, the cellulase enzyme is produced using a cellulase producing microorganism, which can be selected from the group consisting of *Saccharomyces cerevisiae, E. Coli, Lactobacillus*, and *Clostridium* strains.

Preferably, de-ashing the sludge is accomplished by physical means. Examples of such physical de-ashing means include water-washing on a screen, continuous centrifugation, air flotation, and solid/liquid separation methods.

A preferred acid is $H_2SO_4$ and a preferred alkali is NaOH. Other suitable acids that can be used in the methods of the invention include acetic acid, nitric acid, hydrochloric acid, and lactic acid. Other suitable alkalis that can be used in the methods of the invention include calcium hydroxide. Other suitable acids and alkalis can be determined by those of ordinary skill in the field without undue experimentation.

In an embodiment of the invention, the pulp mill process is a Kraft paper mill process.

In another embodiment of the invention, the resulting sludge is a primary carbon source and mixtures of organic salts are a primary nitrogen source.

The foregoing detailed description of the preferred embodiments and the appended tables, figures and references, which are incorporated herein in their entireties, have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

TABLE 1

Composition of untreated and de-ached Kraft mill primary sludge

| Composition (%) | Untreated Primary Sludge | Sludge 1 | Sludge 2 |
|---|---|---|---|
| Glucan | 44.5 | 52.4 | 63.2 |
| Xylan | 9.9 | 14.2 | 14.9 |
| Lignin | 8.1 | 6.3 | 6.2 |
| Ash | 36.0 | 21.8 | 11.4 |
| Others | 2.0 | 3.3 | 3.2 |

TABLE 2

Composition of primary sludge after centrifugal separation/acid leaching, and alkali leaching

| Composition (%) | Sludge 3 ($H_2SO_4$ leaching) | Sludge 4 ($H_2SO_4$ and NaOH leaching) |
|---|---|---|
| Glucan | 72.6 | 74.5 |
| Xylan | 15.8 | 15.0 |
| Lignin | 4.4 | 3.7 |
| Ash | 4.7 | 3.8 |
| Others | 2.1 | 2.5 |

TABLE 3

Specific activities of cellulolytic and hemicellulolytic enzymes in the fermentation broth of Sludge 4

| | Filter Paper Activity (FPU/mg) | CMCase Activity (IU/mg) | β-Glucosidase (pNPG U/mg) | Xylanase (IU/mg) |
|---|---|---|---|---|
| Cellulase produced from Sludge 4 | 8.0 | 4.4 | 0.5 | 170.2 |

Table 4. Cellulase activity and productivity of *T. reesei* Rut C-30 using de-ashed and chemically treated paper mill sludge as substrates

TABLE 4

Cellulase activity and productivity of *T. reesei* Rut C-30 using de-ashed and chemically treated paper mill sludge as substrates

| | Substrate | | |
|---|---|---|---|
| Parameters | Sludge 2 | Sludge3 | Sludge 4 |
| Fermentation time (h) | 78 | 96 | 132 |

TABLE 4-continued

Cellulase activity and productivity of *T. reesei* Rut C-30 using de-ashed and chemically treated paper mill sludge as substrates

| Parameters | Substrate | | |
|---|---|---|---|
| | Sludge 2 | Sludge 3 | Sludge 4 |
| Filter paper activity (FPU/mL) | 1.6 | 3.2 | 8.0 |
| Specific Filter Paper Activity (FPU/mg protein) | 4.8 | 5.8 | 8.0 |
| Volumetric productivity (FPU/L · h) | 20.5 | 37.5 | 60.6 |
| Yield (FPU/g-cellulose) | 101 | 176 | 307 |

What is claimed is:

1. A method of producing a cellulase enzyme, said method comprising the steps of:
   (a) de-ashing pulp mill sludge by physical means, wherein the sludge comprises lignocellulosic material, wherein the physical means for de-ashing the sludge is selected from the group consisting of water-washing on a screen, continuous centrifugation, air flotation, and solid/liquid separation methods;
   (b) treating the product of step (a) with an acid, and then washing off the acid with water; wherein the acid is added in an amount sufficient to remove additional ash from the product of step (a);
   (c) treating the product of step (b) with an alkali, wherein the alkali is added in an amount sufficient to remove additional ash from the product of step (b); and
   (d) fermenting the product of step (c) with a cellulase producing microorganism to produce the cellulase enzyme, wherein the product of step (c) is a carbon source for the cellulase producing microorganism to produce the cellulase enzyme.

2. The method of claim 1, wherein the acid is selected from the group consisting of sulfuric acid, acetic acid, nitric acid, hydrochloric acid, and lactic acid.

3. The method of claim 1, wherein the acid is sulfuric acid.

4. The method of claim 1, wherein the alkali is selected from the group consisting of sodium hydroxide and calcium hydroxide.

5. The method of claim 1, wherein the alkali is sodium hydroxide.

6. The method of claim 1, wherein the physical means for de-ashing the sludge comprises water-washing on a screen.

7. The method of claim 1, wherein the physical means for de-ashing the sludge comprises continuous centrifugation.

8. The method of claim 1, wherein the physical means for de-ashing the sludge comprises air flotation.

9. The method of claim 1, wherein the physical means for de-ashing the sludge comprises solid/liquid separation methods.

10. The method of claim 1, wherein the cellulase producing microorganism is *Trichoderma Reesei*.

* * * * *